(12) United States Patent
Aberl

(10) Patent No.: US 10,860,915 B2
(45) Date of Patent: Dec. 8, 2020

(54) IDENTIFICATION OF WORKPIECES AND IDENTIFIABLE MATERIAL AND IDENTIFIABLE WORKPIECES

(71) Applicant: Aberl Ingenieurbüro, Garmisch-Partenkirchen (DE)

(72) Inventor: Hannes Aberl, Klais (DE)

(73) Assignee: Aberl Ingenieurbüro, Garmisch-Partenkirchen (DE)

( * ) Notice: Subject to any disclaimer, the term of this patent is extended or adjusted under 35 U.S.C. 154(b) by 0 days.

(21) Appl. No.: 15/762,072

(22) PCT Filed: Sep. 21, 2016

(86) PCT No.: PCT/EP2016/001582
§ 371 (c)(1),
(2) Date: Aug. 20, 2018

(87) PCT Pub. No.: WO2017/050430
PCT Pub. Date: Mar. 30, 2017

(65) Prior Publication Data
US 2019/0005371 A1 Jan. 3, 2019

(30) Foreign Application Priority Data

Sep. 21, 2015 (EP) .................................... 15002724
Feb. 1, 2016 (EP) .................................... 16020025

(51) Int. Cl.
*G06K 19/077* (2006.01)
*G06Q 10/08* (2012.01)
*G06Q 10/00* (2012.01)
*G06Q 50/28* (2012.01)
*G08C 17/02* (2006.01)

(52) U.S. Cl.
CPC ....... *G06K 19/07758* (2013.01); *G06Q 10/00* (2013.01); *G06Q 10/08* (2013.01); *G06Q 10/0833* (2013.01); *G06Q 50/28* (2013.01); *G08C 17/02* (2013.01)

(58) Field of Classification Search
None
See application file for complete search history.

(56) References Cited

U.S. PATENT DOCUMENTS

| | | | | |
|---|---|---|---|---|
| 5,850,187 A | * | 12/1998 | Carrender | G06K 7/0008 340/10.6 |
| 7,538,681 B1 | * | 5/2009 | Sharma | G06K 7/0008 235/375 |
| 7,889,082 B2 | * | 2/2011 | Bauchot | G06Q 10/06 340/572.1 |
| 8,115,634 B2 | * | 2/2012 | Napolitano | G06K 19/0776 340/572.1 |

(Continued)

*Primary Examiner* — Chico A Foxx
(74) *Attorney, Agent, or Firm* — Mahamedi IP Law LLP

(57) ABSTRACT

The present application relates to a post-shipment inspection method, a workpiece useable in the method, and a post-shipment inspection system. Furthermore, the present application relates to an identifiable material including identification means disposed therein, a workpiece produced therefrom, a corresponding production method and identification method for such workpieces. Also disclosed are an identification method for a plurality of workpieces including identification means integrated therein and corresponding devices and a computer program product.

12 Claims, 12 Drawing Sheets

(56) References Cited

U.S. PATENT DOCUMENTS

| | | | |
|---|---|---|---|
| 10,068,217 B1* | 9/2018 | Gopalakrishnan | G06F 11/3055 |
| 2004/0078306 A1* | 4/2004 | Whiteley | G06Q 10/087 705/28 |
| 2004/0098272 A1* | 5/2004 | Kapsis | G06Q 10/08 705/333 |
| 2005/0149226 A1* | 7/2005 | Stevens | B65G 1/1378 700/214 |
| 2005/0236478 A1* | 10/2005 | St. Clair | G06Q 10/08 235/384 |
| 2006/0101067 A1* | 5/2006 | Kilian-Kehr | G06Q 10/08 |
| 2007/0001839 A1* | 1/2007 | Cambre | G06Q 10/08 340/539.12 |
| 2007/0069895 A1* | 3/2007 | Koh | G06K 19/02 340/572.1 |
| 2007/0124220 A1* | 5/2007 | Griggs | E21B 17/006 705/28 |
| 2007/0279287 A1* | 12/2007 | Castaneda | H01Q 1/2266 343/700 MS |
| 2008/0129504 A1* | 6/2008 | Killian | G01T 7/00 340/572.1 |
| 2008/0297354 A1* | 12/2008 | Foley | H04L 9/3271 340/572.4 |
| 2010/0045436 A1* | 2/2010 | Rinkes | H04Q 9/00 340/10.1 |
| 2010/0219236 A1* | 9/2010 | Vitt | B28B 23/0031 235/375 |
| 2011/0133925 A1* | 6/2011 | Hummer | G08B 21/12 340/539.1 |
| 2012/0295700 A1* | 11/2012 | Reiche | A63F 13/79 463/29 |
| 2014/0145822 A1* | 5/2014 | Shoenfeld | G07C 9/00111 340/5.61 |
| 2016/0307246 A1* | 10/2016 | Porubcan | G06Q 30/0609 |

\* cited by examiner

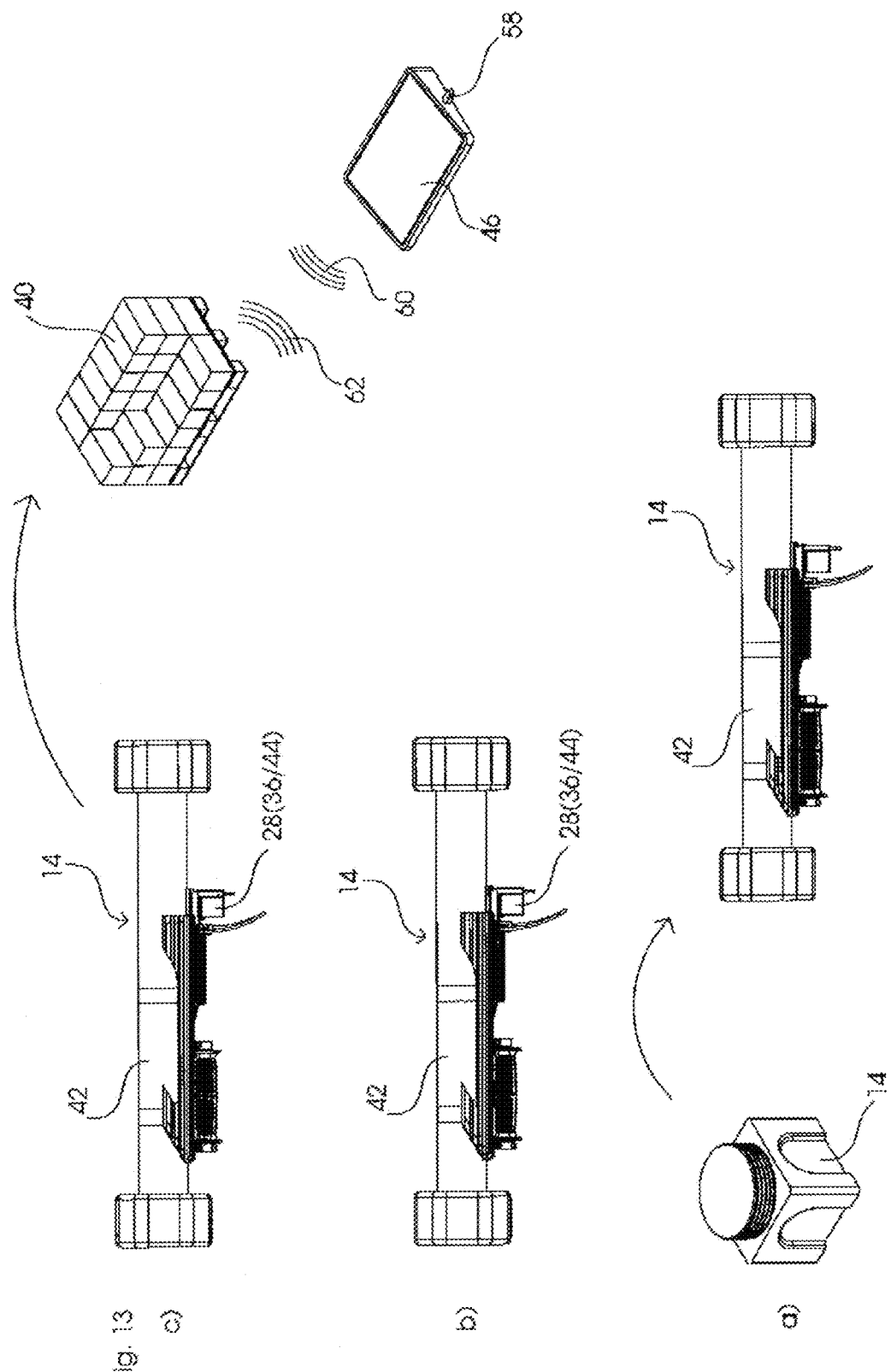

IDENTIFICATION OF WORKPIECES AND IDENTIFIABLE MATERIAL AND IDENTIFIABLE WORKPIECES

FIELD OF THE INVENTION

The invention relates to the identification of workpieces, identifiable materials, identifiable workpieces, and methods and devices for the production and identification thereof.

BACKGROUND OF THE INVENTION

Automation of the production, storage, logistics and sales poses increasing demands on the automatic and reliable identification of materials and workpieces/products.

Due to their low-cost production in large numbers, transponders, especially such having RFID chips, are used in a variety of fields of identification, such as, for example, access control to buildings, backtracking documents and registration of goods at the supermarket checkout.

For enabling a reliable identification of products it is desirable to reduce the possibilities for abusive manipulation or removal of the identification means.

Such demands arise, in particular, in the field of the so-called "post-shipment" control of workpieces, i.e. the control of workpieces after they have left a place (e.g. of production, packaging, etc.), especially in external trade or external trade law.

It is the object of the present invention to improve the identification of workpieces, especially in the field of the so-called "post-shipment" control.

The present invention is further based on the object of providing identifiable materials, identifiable workpieces, and methods and devices for the production or identification of identifiable workpieces.

BRIEF DESCRIPTION OF THE INVENTION

This object is achieved by subject matters according to the independent patent claims. The dependent patent claims define further embodiments.

Explanations in connection with one of the subject matters disclosed herein (e.g. method, device, etc.) made in the following apply analogously to any other of the subject matters disclosed herein unless explicitly specified otherwise.

Disclosed is a post-shipment inspection method for a workpiece to be inspected which comprises at least one integrated identification means, each containing an identification code uniquely identifying the workpiece, and at which a detection device including an interrogation means and a transceiving means is arranged in spatial association with at least one of the at least one identification means.

The method comprises the steps of interrogating the at least one identification means by the interrogation means for obtaining the identification code, and transmitting the interrogated identification code to a computer system by the transceiving means, and comparing the transmitted identification code to at least one predetermined identification code by the computer system in order to verify whether the workpiece to be inspected is a predetermined workpiece.

In particular, it is intended that, when the comparison yields that the Identification code of the workpiece to be inspected and the, or one of the, predetermined identification code(s) match, it is determined that the workpiece to be inspected is the predetermined workpiece and is present.

Thus, it can, for example, be determined that a shipment, a package, etc. which is to comprise certain workpieces (products) actually includes one of them.

When it arises from the inspection of a plurality of workpieces to be inspected that there is an identification code of a workpiece to be inspected transmitted to the computer system for each predetermined identification code, it can be determined that all predetermined workpieces are present.

Thus, it can, for example, be determined that a shipment, a package, etc. which is to comprise certain workpieces (products) actually includes all of them.

When the comparison yields that the identification code of the workpiece to be inspected and none of the predetermined identification codes match, it can be determined that the workpiece to be inspected is present but is not the predetermined, desired one. Thus, it can, for example, be determined that a workpiece is present which was not expected to be present. For example, this can be the case when a shipment, a package, etc. which is to comprise certain workpieces (products) includes workpieces (products) not belonging to the shipment, package, etc.

As to the features, embodiments and variants of the identification means and the identification code, it is referred to the respective explanations in this respect made further below which apply analogously here.

In the method, the workpiece to be inspected can be provided in one location and the interrogating and comparing steps can be performed in another location in order to verify whether and/or when the workpiece to be inspected is present in the other location.

In the method, the at least one identification means can be a transponder, and/or the computer system can comprise a transceiving device specially adapted for communication with the transceiving means of the detection device.

In the method, the transmitted identification code can be verified by comparing it to a database containing identification codes.

In the method, a plurality of identification means can be included in the workpiece, at least a part of the plurality of identification means can be detected, and the workpiece can be considered as identified and present, respectively, when a predetermined minimum number of the identification means are detected, and/or a predetermined minimum portion of the plurality of identification means is detected.

Further disclosed is a workpiece, especially for use in a method disclosed herein, wherein the workpiece comprises at least one integrated identification means, each containing an identification code uniquely identifying the workplace, and at which a detection device including an interrogation means and a transceiving means is arranged in spatial association with at least one of the at least one identification means.

In the workpiece, the at least one Identification means can be a transponder.

The identification means can be installed in or attached to the workpiece, both of which will be referred to as integrated herein. For example, the identification means can be installed in the workpiece as a component in a manner difficult to access or not accessible at all from the outside, or can be arranged externally at the workpiece, e.g. adhered (e.g. as a film), screwed, welded, etc.

The workpiece can be made of an identifiable material comprising a primary formable starting material and at least one identification means disposed in the starting material, each identification means containing an identification code uniquely distinguishing the material from other materials made of the primary formable starting material.

A plurality of identification means can be disposed in the starting material in a distributed manner.

The at least one identification means can comprise at least one of the following components: an antenna, an oscillating circuit, a circuit, a microprocessor, a read-only memory (ROM), a one-time programmable read-only memory (PROM), an EPROM, an EEPROM, a FRAM or FeRAM.

Also disclosed is a post-shipment inspection system for a workpiece to be inspected comprising a computer system including a transceiving device, and a workpiece to be inspected which comprises at least one integrated identification means, each containing an identification code uniquely identifying the workpiece, and at which a detection device including an interrogation means and a transceiving means is arranged in spatial association with at least one of the at least identification means, wherein the interrogation means is arranged to interrogate the at least one identification means for obtaining the identification code, and the transceiving means is arranged to transmit the interrogated identification code to the transceiving device of the computer system, and wherein the computer system is adapted to compare the transmitted identification code to at least one predetermined identification code in order to verify whether the workpiece to be inspected is present.

The above explanations regarding the comparison apply analogously here.

The computer system can comprise a transceiving device specially adapted for communication with the transceiving means of the detection device.

The workpiece can be a workpiece disclosed herein which can also be a workpiece made of an identifiable material disclosed herein.

Further disclosed is a computer program product that is stored in a computer-readable medium and Includes a program code which, when executed by a computer, performs the steps of a method disclosed herein, especially the post-shipment inspection method.

An identifiable material is disclosed which comprises a primary formable starting material and at least one identification means disposed in the starting material.

The material disclosed herein can be used in an above-mentioned workpiece for the (at least partial) production thereof and provide the at least one identification means therein.

In the following, "material" particularly is to refer to the largely untreated raw material and "workpiece" particularly is to refer to the largely processed product.

The starting material can be described as shapeless to the extent that it not (yet) has the shape the material and/or a workpiece made thereof is/are supposed to have.

The starting material comprises materials and substances in the sense of production engineering, especially in the following states: liquid, plastic or pasty, pulpy or paste-like, granular or powdery, chip-like, fiber-like, gaseous or vaporous, ionized, bulk material.

In the following, "primary formable" can be understood especially in the sense of DIN standard 8580: Primary shaping is to be understood as the production of a geometrically specific, solid body (e.g. a workpiece) from a substance (e.g. a starting material or basic material) that is shapeless—as compared to the body—by creating a material cohesion. In particular, a plurality of starting materials are included which can be distinguished, for example, in accordance with their states (liquid, plastic or pasty, pulpy or paste-like, granular or powdery, chip-like, fiber-like, gaseous or vaporous, ionized, etc.). Accordingly, primary formable is to refer to the suitability of a starting material for primary shaping.

In the following, "identifiable" particularly is to indicate that the material and/or a workpiece made therefrom can be identified and, in particular, distinguished from other materials and workpieces, respectively. "Identifiable" comprises a unique identifiability of a material (e.g. of materials having the same starting material and/or materials having a different starting material) as well as the identifiability of a type of material (e.g. materials having the same starting material, the same delivery date, the same origin or supplier, etc.). Identifiability is achieved by means of the identification means.

For this purpose, the material and/or a workpiece made therefrom can be assigned (programmed, written) an identification code. The identification code can be integrated into the identification means and can be determined (detected, read) as well as changed at a later point in time in order to identify the material or a workpiece made therefrom on the basis of the identification code and to assign a unique identification (which may also be referred to as identifier), respectively.

An identification code can preferably comprise an identification number, an identification key, an identification signal and/or a binary value.

One or more of the following characteristics can be identified by an identification code in relation to a material: a chemical composition of the material, a delivery date of the material, an origin or supplier of a material, etc. An identification code can be unique to a material, but does not have to be unique to a material. For example, a plurality of different materials may have a same delivery date.

In the following, identification means is to refer to any device which is adapted to be assigned an identification code, which identification code can be detected (read).

Preferably, a plurality of identification means can be disposed in the starting material in a distributed manner. In particular, this distribution can be carried out randomly or stochastically. Alternatively, this distribution can be substantially homogeneous or uniform. The distribution can be carried out, for example, by mixing. The number of identification means in the starting material or the number of identification means per amount of substance of the starting material can also be determined randomly or stochastically. Alternatively, the number of identification means in the starting material or the number of identification means per amount of substance of the starting material can be predetermined, for example, on the basis of the size and/or amount of the workpieces to be produced. A plurality of identification means are advantageous because this makes the removal or destruction or abusive manipulation of all of them difficult.

Preferably, the at least one identification means can be one-time or multi-time programmable. In the following, programming (or writing) an identification means is to refer to writing an identification code into or onto the identification means, which identification code can be detected (or read) at a later point in time for identifying the identification means and/or a material comprising the identification means and/or a workpiece comprising the identification means.

Programming the at least one identification means can preferably be carried out by means of radiation, e.g. radio waves in the case of RFID transponder(s) as identification means $14(n)$. One-time programmable identification means are preferred in some embodiments when an identification code, for example, a serial number, is to be permanently assigned without the possibility to change this identification code subsequently. Multi-time programmable identification means are preferred when the identification code is to be changeable after assignment. A change in identification code after a first assignment can further be tied to criteria excluding or complicating abusive manipulation. For example, the identification means can especially be adapted to permit a change after authentication only, e.g. by communicating a passcode. Alternatively or in addition thereto, the identification means can be adapted to record the change. For example, a binary change flag can be set to "true", or an increment counter of the number of changes performed can be incremented by 1 when a change in the identification means occurs. Furthermore, methods disclosed herein can complicate abusive manipulation also in multi-time programmable identification means by requiring, in some embodiments, that, for example, all identification means of the plurality of identification means have to be changed equally which can be made difficult or impossible by the sheer number of identification means.

Preferably, the starting material can comprise at least one of the following types of starting materials: plastic material, fiber composite, resin, varnish, radiation-curable liquid, plaster, ceramics, clay, metal. The starting material may be present in one of the following states: liquid, plastic or pasty, pulpy or paste-like, granular or powdery, chip-like, fiber-like, gaseous or vaporous, ionized.

Preferably, a solid body can be produced from the starting material by at least one of the following primary-shaping production methods: thermoplastic primary shaping (e.g. pressing, deep drawing, etc.), injection molding, extrusion, sintering, laser sintering, 3D printing, die casting.

In injection molding, the starting material is injected into a shaping cavity from which it can be removed as workpiece after curing. Also in die casting, a casting mold functions as a template for the workpiece to be cast. In extrusion, the starting material is pressed through a shaping opening, e.g. a nozzle, for producing an elongate workpiece having a cross-section determined by the opening. In laser sintering, a fine-grained or powdery starting material is heated by a laser for creating material cohesion. Also in 3D printing, the production is carried out typically layer by layer and by scanning.

The at least one identification means can preferably be a transceiver, wherein transceiver refers to a device that may be operated as both, a transmitter and a receiver.

The at least one identification means can preferably be a transponder. In the following, transponder is to refer to a device that transmits (transmitter) a signal in response (responder) to a received request. This includes passive transponders not having a power supply of their own and being externally supplied with power required for operation, and active transponders having a power supply of their own. Passive transponders can receive the power required for operation, for example, from a request signal by which the transponder is accessed.

Preferably, the at least one identification means can comprise one in of the following components: an antenna, an oscillating circuit, an analog circuit, a digital circuit, a microprocessor, a read-only memory (ROM), a one-time programmable read-only memory (PROM), an EPROM, an EEPROM, a FRAM or FeRAM.

Particularly preferably, the at least one identification means can be an RFID transponder. RFID transponders use electromagnetic waves in the radio frequency range as signals. The signals may serve the purposes of writing/programming the RFID transponder and/or reading/detecting the RFID transponder.

Particularly preferably, a passive RFID transponder is used. A passive RFID transponder can comprise, for example, an oscillating circuit or a coil as an antenna and a digital circuit. The digital circuit can function as a microcontroller and/or memory. An electromagnetic alternating field having a frequency in the radio frequency range can be received by the antenna, transmitted to the digital circuit, and processed by it. The digital circuit can then generate a response signal that is transmitted by the antenna as a field-weakening modulation or out-of-phase reflection of the irradiated alternating field. Thus, a passive RFID transponder can respond without having to generate a field of its own.

Furthermore, a method for producing an identifiable workpiece is disclosed. The production method comprises providing an identifiable material disclosed herein, and performing a primary-shaping production method for producing an identifiable workpiece from the identifiable material.

In particular, the following products are to be included in the term "workpiece": vehicle components, such as a bumper, steering wheel, car body; electronics accessories, such as a laptop casing, smartphone casing; machine components, such as bearings, pinions, shafts; airplane components, such as wings, doors, seats; packages, such as shampoo bottles, yoghurt pots; other products, such as tools and firearms.

As described above, identifiable is to mean that an identification code can be assigned (programmed, written), which identification code can be determined (detected, read) as well as changed at a later point in time. Thus, it is possible to assign a unique identification (which may also be referred to as identifier) to the workpiece and to uniquely identify the workpiece using the same, respectively.

In particular, one or more of the following characteristics can be identified in relation to a workpiece: a serial number (unique to each workpiece), a production date, a batch number (unique to all workpieces of a production batch), a product identifier (unique to all substantially identical workpieces of a production series), a receiver (which can be the same for all workpieces of a batch, but does not have to be). An identification code can be unique to a workpiece (e.g. serial number), however, does not have to be unique to a workpiece (e.g. product identifier).

Preferably, providing the identifiable material comprises mixing the primary formable starting material with the at least one identification means. Mixing can be chosen according to the state (liquid, plastic or pasty, pulpy or paste-like, granular or powdery, chip-like, fiber-like, gaseous or vaporous, ionized) of the primary formable starting material and can be carried out, for example, using a moveable mixing space (drum) or moveable mixing tool (screw or paddle mixer).

Preferably, the production method further comprises programming the at least one identification means. The time of programming in the course of the production method is not limited thereby. For example, programming the at least one identification means can be performed prior to mixing with the primary formable starting material, after mixing with the primary formable starting material, after providing the identifiable material and/or after performing the primary-shaping production method. When multi-time programmable identification means are used, a plurality of programming steps can be included in the production method at various points in time.

Furthermore, a workpiece produced by a primary-shaping production method is disclosed, wherein the primary-shaping production method uses an identifiable material.

The workpiece can preferably comprise a plurality of identification means which are disposed in the workpiece in a distributed manner.

The workpiece can preferably be produced by a production method disclosed herein.

Preferably, the workpiece can be adapted to be rendered useless or destroyed when the at least one identification means is removed or destroyed. The at least one identification means can be removed, for example, physically by one or a plurality of tools (e.g. a file) that expose the at least one identification means and release it from the material cohesion. The number of identification means in the workpiece can be selected to have such an amount that the removal of all identification means requires great efforts and/or such that essential parts of the workpiece must be removed in order to expose all identification means.

The at least one identification means can further be destroyed, for example, thermally or by means of radiation. The primary formable starting material can be selected such that a destruction of the at least one identification means by such thermal or radiative means results in a dissolution of the material cohesion of the workpiece. For example, the starting material can contain additives, such as metallic particles, that react to radiation in the microwave or UV range by generation of excessive heat so that the workpiece is destroyed or rendered useless by the generated heat. However, it is intended to design the identification means and/or measures for rendering them (substantially) inoperable such that it may be possible, even after that, to determine identification codes contained in one or a plurality of identification means, for example, by forensic methods.

Furthermore, an identification method is disclosed which comprises providing a workpiece disclosed herein, and detecting the at least one identification means in the workpiece.

In the following, "detecting" (or reading) an identification means is to refer to reading an identification code of the Identification means, which identification code has been programmed (or written) at an earlier point in time, for identifying the Identification means and/or a material comprising the identification means and/or a workpiece comprising the identification means. Detecting the at least one identification means can preferably be carried out by means of radiation, e.g. radio waves in the case of RFID transponder(s) as identification means.

A plurality of identification means can preferably be contained in the workpiece, and at least a part of the plurality of identification means can be detected.

The workpiece can preferably be considered as identified when a predetermined minimum number of the identification means are detected and/or a predetermined minimum portion of the plurality of identification means is detected.

Furthermore, a computer program product is disclosed that is stored in a computer-readable medium and includes a program code which, when executed by a computer, performs the steps of a method disclosed herein, especially an identification method disclosed herein.

Furthermore, the present invention relates to an identification method comprising:
 interrogating, by an interrogation means, a plurality of workpieces including identification means integrated therein, each providing an identification code for obtaining the respective identification codes;
 communicating the interrogated identification codes from the interrogation means to a transceiving means arranged adjacent to the workpieces;
 transmitting the communicated identification codes from the transceiving means to a remote computer system;
 verifying the transmitted identification codes by comparing them to a database containing identification codes.

In the identification method, communicating the interrogated identification codes from the interrogation means to the transceiving means can be carried out wirelessly.

In the identification method, transmitting the communicated identification codes from the transceiving means to the remote computer system can be carried out, at least in part, via the Internet.

In the identification method, when verifying the transmitted identification codes by comparing them to a database containing identification codes, it can be verified whether predetermined identification codes contained in the database have been transmitted.

Furthermore, a device and a computer program product for performing the above identification method are disclosed.

BRIEF DESCRIPTION OF THE DRAWINGS

Some embodiments of the present invention shall be described on the basis of the drawings in the following.

FIG. 13 shows schematic representations for illustrating a post-shipment inspection method and a post-shipment inspection, system, respectively.

DESCRIPTION OF THE DRAWINGS

Figure 1:
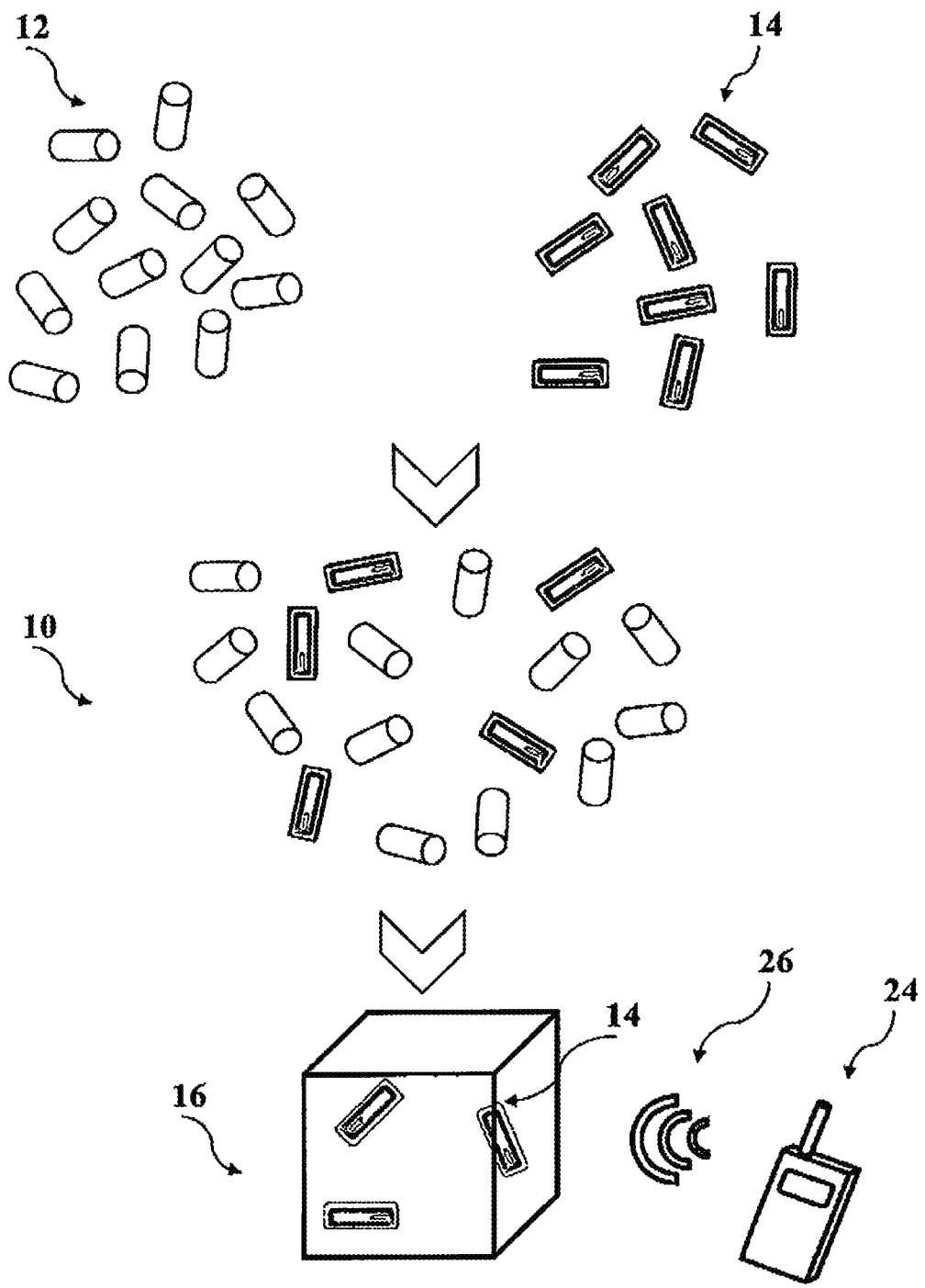
FIG. 1 shows an embodiment of a method for producing a workpiece.

In the following, initially basic comments and then a description of various embodiments of subject matters disclosed herein will be given.

When trading products, which are also referred to as workpieces herein, it is often necessary to verify whether and/or when a product/workpiece is located in a specific place, and/or to determine the location of a product/workpiece.

For example, it may be of interest to verify whether and/or when a product/workpiece has arrived at the recipient, is located in an Interim storage facility, is used for the production of further products/workpieces and the like.

Such measures, which are also referred to as post-shipment inspection methods, are desirable or even prescribed, for example, in products/workpieces that are relevant to security and/or require secrecy, such as e.g. arms, safety technological products, electronics, computer chips, data carriers, etc. This may also apply to products/workpieces that are protected, for example, by a copyright, patent, trademark, design patent, and/or in which it is to be avoided that plagiarism, imitator products, replicas, etc. are used; examples of that include, for example, spare parts in the automotive or aviation industry.

When workpieces (e.g. in the form of components) are used for producing further workpieces (e.g. products into which one or more components are integrated), one may also—figuratively—speak of post-shipment inspection methods, namely when it is verified whether the correct ones and/or all of the workpieces to be used for the production thereof are present in the produced workpiece.

A particularly illustrative example is the field of arms to which it is representatively referred to here for non-limiting illustration.

When selling arms, and notably when exporting the same, it is required (usually even for legal reasons) to verify where an arm is located and/or where an arm is located at a certain time. This is necessary, for example, for verifying that an arm destined for a certain country will actually arrive there and, if applicable, remains there, and to avoid that the arm arrives at another country, respectively.

The present application discloses a post-shipment inspection method and a post-shipment inspection system as well as workpieces that can be used with both, which will be explained at the end of this description.

Furthermore, the present application discloses an identifiable material that can be used for producing a workpiece which can be used in the post-shipment inspection method and post-shipment inspection system disclosed herein, and a method for producing a workpiece from an identifiable material disclosed herein and a workpiece made of the identifiable material disclosed herein which are each intended for use in the post-shipment inspection method and the post-shipment inspection system disclosed herein.

In addition, the present application discloses an identification method which can be used for identifying a workpiece made of the identifiable material disclosed herein and which can (also) be used in the post-shipment inspection method and post-shipment inspection system disclosed herein.

FIG. 1 shows an embodiment of a method for producing an identifiable workpiece 16. The method comprises providing an identifiable material 10, performing a primary-shaping production method for producing an identifiable workpiece 16 from the identifiable material 10, and programming at least one identification means 14 included in the workpiece 16.

Providing the material 10 comprises mixing a primary formable starting material 12 and a plurality of identification means 14 for disposing the identification means 14 in the starting material 12 in a distributed manner.

The primary-shaping production method can be an injection molding method, as described further below, for example, with reference to FIG. 5, even though the produced workpiece has the shape of a cloud (instead of a cube) in the case of FIG. 5.

In the embodiment illustrated in FIG. 1, at least one identification means 14 included in the workpiece 16 is programmed after completion of the primary-shaping production method. This programming is carried out by means of a programming device 24 transmitting a programming signal 26 as an electromagnetic alternating field in the radio frequency range. In particular, by programming after completion of the primary-shaping production method, each produced workpiece 16 can be assigned a unique identification code, for example, an ascending serial number.

Figure 2A:
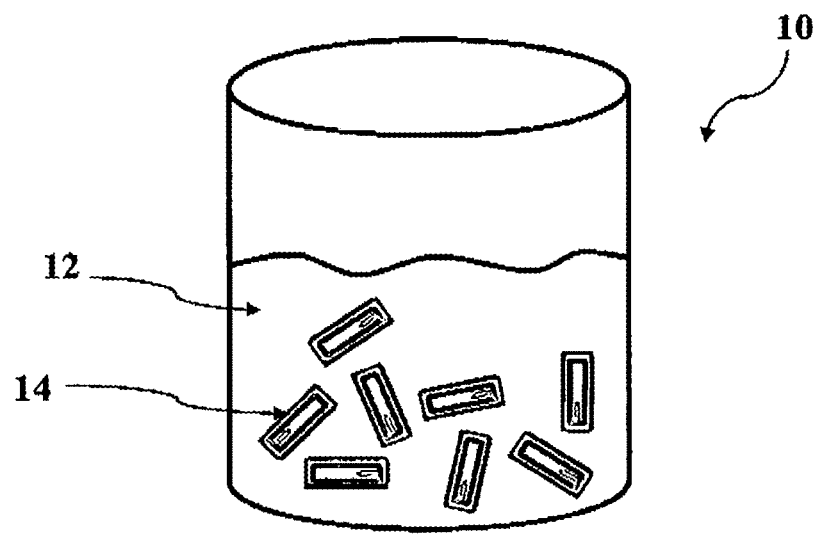
FIG. 2 shows two embodiments of materials, one including a liquid starting material (FIG. 2A) and one including a solid starting material (FIG. 2B).

FIG. 2A shows an embodiment of an identifiable material including a liquid starting material. The material 10 comprises the primary formable starting material 12 and a plurality of identification means 14.

In the illustrated embodiment, the starting material 12 is provided in the form of a radiation-curable liquid. Radiation-curable liquids, such as e.g. photoinitiated-curing acrylates, can be used as a starting material 12 for primary-shaping methods, such as e.g. stereolithography or rapid prototyping, and are thus primary formable. Photoinitiated-curing acrylates are available as resins in the liquid aggregate state and can be excited by electromagnetic radiation, such as ultraviolet light or visible light, for causing polymerization and thus curing.

In the illustrated embodiment, the plurality of identification means 14 are provided in the starting material 12 in a distributed manner. The identification means 14 are transponders, in particular, RFID transponders. The material 10 is identifiable since the identification means 14 are adapted for providing an identification code that can be programmed (written) and detected (read).

Figure 2B:
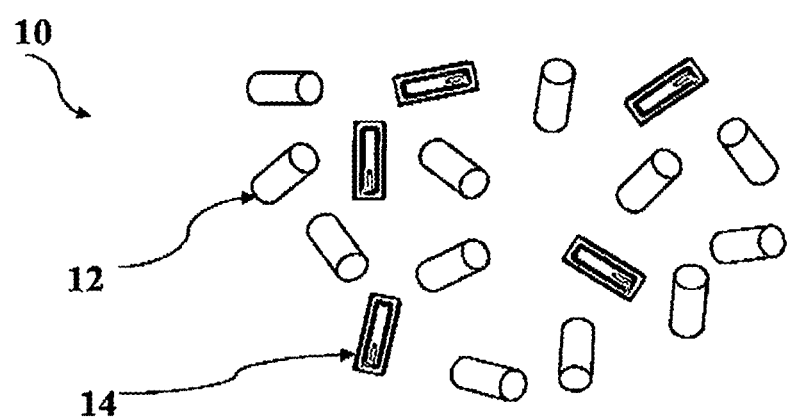

FIG. 2B shows an embodiment of a material including a solid starting material 12. The material 10 comprises the primary formable starting material 12 and a plurality of identification means 14.

In the illustrated embodiment, the starting material 12 is provided in the form of a plastic granulate. The plastic granulate is composed of a plurality of substantially similar cylindrical plastic pellets. Each pellet can have dimensions in the order of a few mm. The plurality of pellets form a bulk material which facilitates storage, transportation and processing. Alternatively or in addition to a plurality of similar pellets, the plastic granulate can also be polydisperse, e.g. comprise pellets of various geometries and/or sizes.

In addition to the illustrated plastic granulate, the starting material 12 can also comprise additives, colorants and/or combined preparations (not shown). Such additives may serve the purpose of changing the properties of workpieces to be produced, especially properties such as color, UV stabilization, flame proofing or antistatic.

The plastic granulate is primary formable. In the illustrated embodiment, especially a granulate of thermoplastic, such as e.g. polyamides, is used. Thermoplastics can be processed especially by primary-shaping methods, such as injection molding or extrusion. The processing can comprise an increase in pressure and/or temperature. For example, some plastic materials have a melting point of 130° C. By increasing the temperature, a thermoplastic can be transformed from the solid aggregate state into the thermoplastic, thermoplastic or liquid aggregate state, thereby enabling or facilitating primary shaping.

In addition to thermoplastics, non-thermoplastics and other types of starting materials are also included in the invention, provided that they are primary formable. The non-thermoplastics comprise especially thermosetting plastics and elastomers. Other starting materials comprise, in particular, fiber composites, resins, plasters, ceramics, clay, metals.

In the illustrated embodiment, the plurality of identification means 14 are provided in the starting material in a distributed manner. The dimensions of the identification means 14 are comparable to those of the plastic pellets of the starting material 12. In other embodiments, the identification means 14 can be larger or smaller than the plastic pellets of the starting material 12. The material 10 is identifiable since the identification means 14 are adapted such that an identification code can be programmed (written) and detected (read). The identification means 14 are transponders, especially RFID transponders, as described in the following with reference to FIG. 3.

Figure 3:
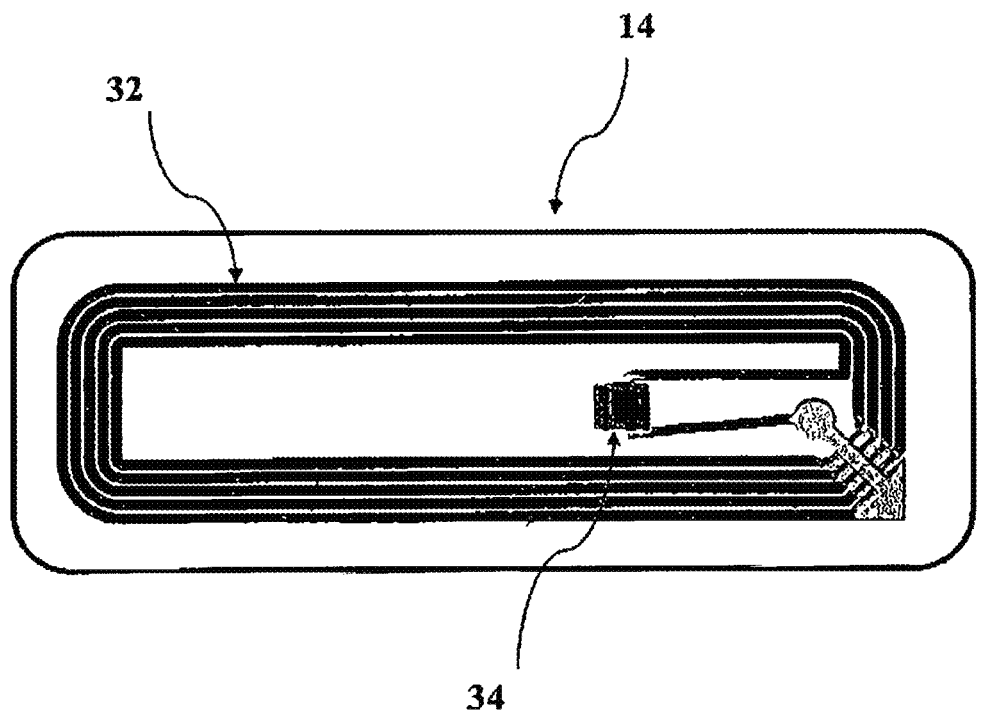
FIG. 3 shows an identification means 14 of one embodiment.

FIG. 3 shows an identification means 14 of an embodiment. The illustrated identification means 14 is an RFID transponder 14. The RFID transponder 14 comprises an antenna 32 and a digital circuit 34. The identification means 14 is adapted such that an identification code can be programmed (written) and detected (read).

The antenna 32 serves the purpose of detecting an electromagnetic alternating field in the radio frequency range, here especially at 13.56 MHz. The digital circuit 34 functions as a microprocessor and memory.

An identification code can be stored in the memory as a digital value. Storing (programming) an identification code can be carried out at the factory during the production of the identification means 14 or at a later point in time, for example, by means of radio frequency waves. For this purpose, an external programming device (not shown) can generate an electromagnetic alternating field in the radio frequency range (radio frequency waves) which encodes a programming signal. The alternating field is received by the antenna 32, transmitted to the digital circuit 34, and processed by the microprocessor. The microprocessor decodes the programming signal, extracts the identification code to be programmed, and transmits a corresponding write instruction to the memory. In some embodiments, the microprocessor can further generate a response signal signaling a successful execution of the programming process to the external programming device. According to the embodiment, the identification means 14 can be adapted such that the programming can be performed once or multiple times. In the present embodiment of a passive RFID transponder, the memory included in the digital circuit is an EEPROM (electrically erasable programmable read-only memory) which, as a non-volatile memory, is able to maintain the storage of the identification code without supply of power.

In case an identification code is or has been stored in the memory as a digital value, this identification code can be interrogated (detected) by means of radio frequency waves. For this purpose, an external reading device (not shown) can generate an electromagnetic alternating field in the radio frequency range (radio frequency waves) which encodes an interrogation signal. The alternating field is received by the antenna 32, transmitted to the digital circuit 34, and processed by the microprocessor. The microprocessor decodes the interrogation signal, transmits a corresponding read instruction to the memory, and generates a response signal based on the identification code read out from the memory, which response signal is transmitted to the external reading device via the antenna. In the present embodiment, a passive RFID transponder is used which is operated without a separate power source and the antenna of which transmits the response signal as a field-weakening modulation or out-of-phase reflection of the alternating field irradiated from the reading device.

The programming signal and/or interrogation signal and/or response signal can be transmitted encrypted, e.g. using a 128-bit encryption according to the AES (Advance Encryption Standard) standard.

Figure 4:
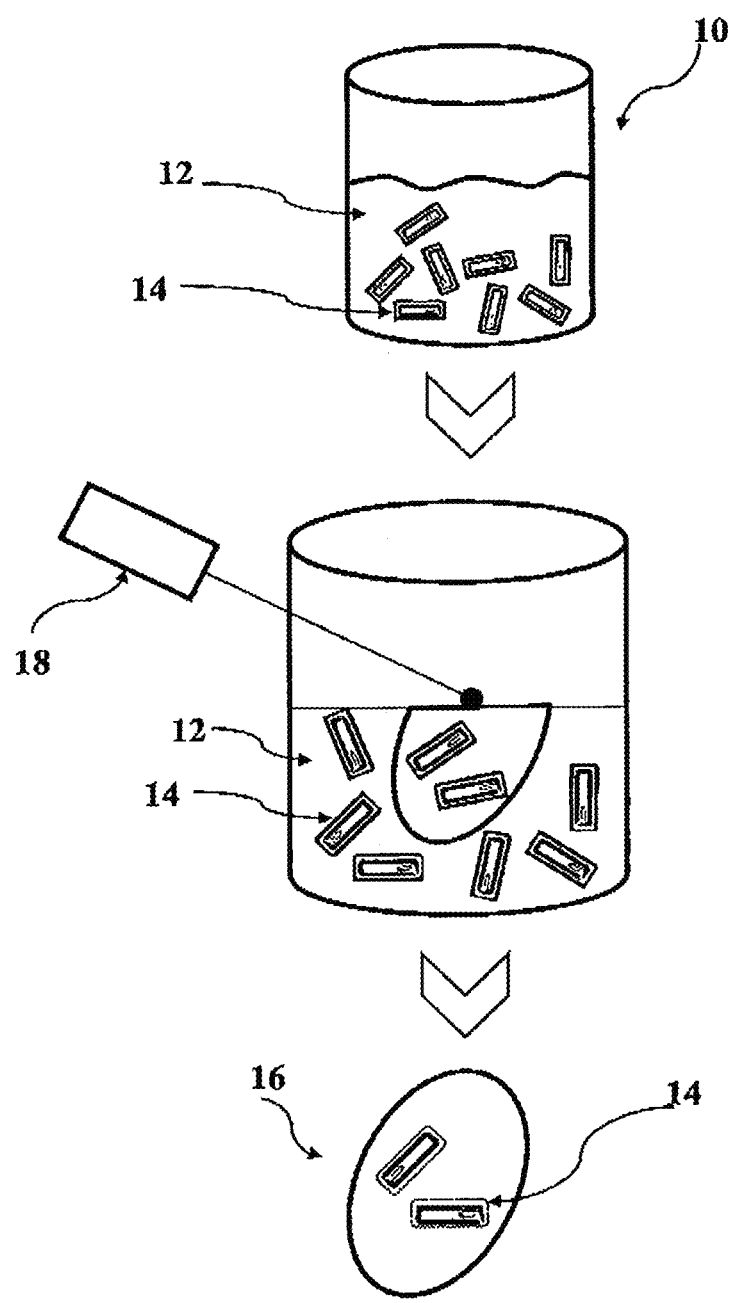
FIG. 4 shows a graphical representation of a method for producing a workpiece.

FIG. 4 illustrates an embodiment of a method for producing an identifiable workpiece. The production method comprises providing an identifiable material 10 and performing a primary-shaping production method for producing an identifiable workpiece 16 from the identifiable material 10.

The identifiable material 10 comprises a primary formable starting material 12 and at least one identification means 14 disposed in the starting material 12. The primary formable starting material 12 is a radiation-curable liquid, especially a photoinitiated-curing acrylic resin. A stereolithography method is provided as a primary-shaping production method here. In this connection, the beam of a UV light source 18 is focused on the radiation-curable liquid 12 in such a manlier that this liquid is cured substantially selectively. By scanning the beam of the UV light source 18, the material cohesion for a three-dimensional workpiece 16 can be produced layer by layer. According to the embodiment of the stereolithography method, the UV light source, the focus of the beam and/or the workpiece being produced are moved for performing the layered scanning.

Identification means 14 contained in the material 10 are surrounded by the radiation-curable liquid based on their position and are enclosed by the workpiece being created in the course of curing. In the present case, the workpiece is egg-shaped and includes two identification means 14.

Figure 5:
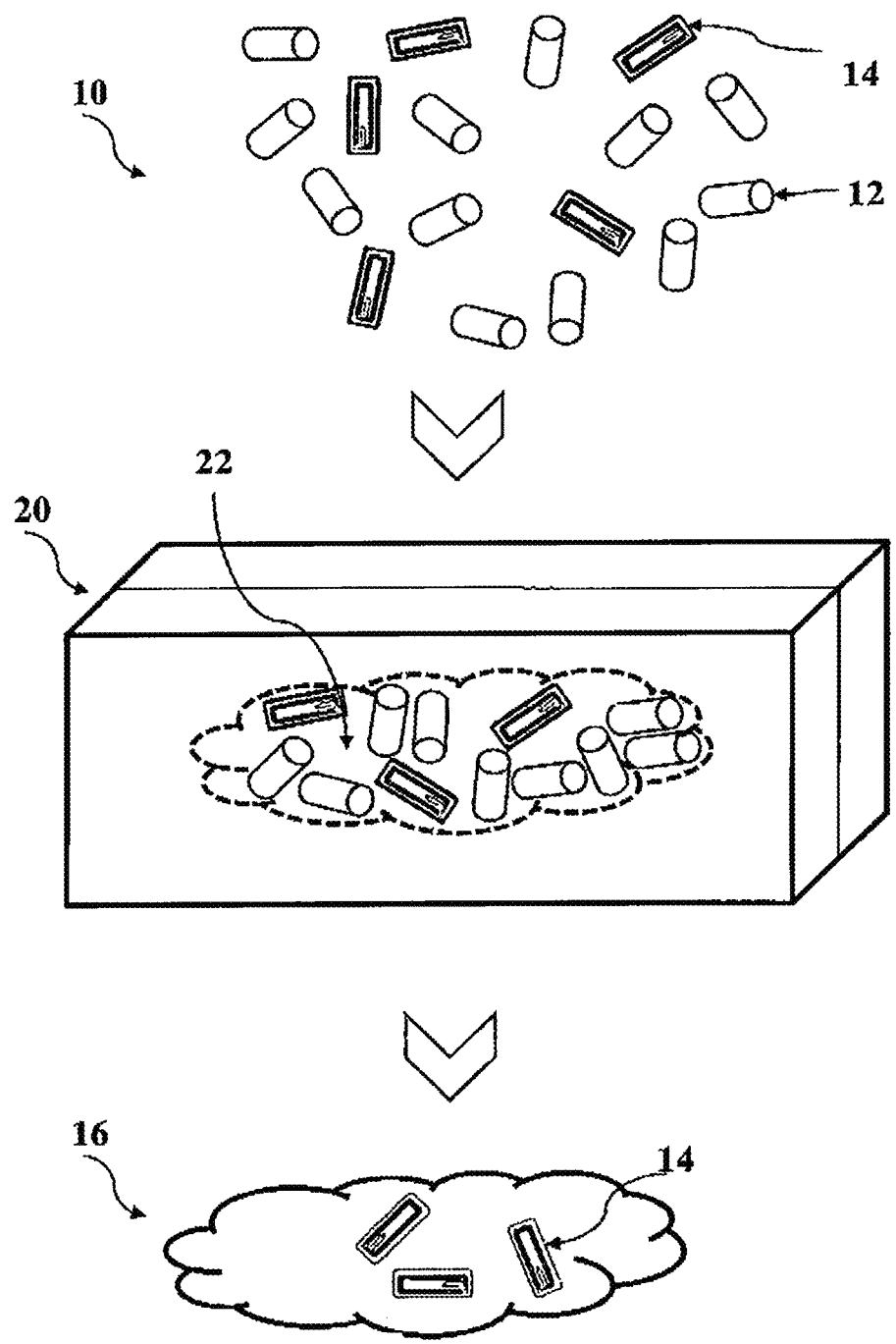
FIG. 5 shows a graphical representation of a method for producing a workpiece.

FIG. 5 illustrates an embodiment of a method for producing an identifiable workpiece. The production method comprises providing an identifiable material 10 and performing a primary shaping production method for producing an identifiable workpiece 16 from the identifiable material 10.

The identifiable material 10 comprises a primary formable starting material 12 and at least one identification means 14 disposed in the starting material 12. The illustrated case includes a plurality of similar and distributed identification means 14. In the illustrated case, the workpiece 16 to be produced comprises a plurality of identification means 14, even though not all of the identification means 14 included in the material 10, since not all of the material 10 is used for producing the workpiece 16. In other embodiments, the workpiece 16 can comprise all identification means 14 included in the material 10.

The primary formable starting material 12 is a thermoplastic granulate. Here, the primary-shaping production method is an injection molding method. In this connection, the material 10 is heated (not shown) and thus the primary formable starting material 12 is brought into the thermoplastic state. Furthermore, at least a part of the material 10, together with identification means 14 contained therein, is injected into a cavity 22 of a mold 20 so that the cavity 22 is substantially filled. The identification means 14 remain included in the material 10. The identification means 14 and the primary formable starting material 14 are then located in the cavity. The identification means 14 are RFID transponders which are preferably heat-resistant up to a temperature (e.g. 180° C.) beyond the melting temperature of the plastic granulate (e.g. 130° C.).

The cavity 22, which is illustrated by a dashed line, is enclosed by the mold 20. The part of the material 10 enclosed by the cavity 22 is brought into the solid aggregate state by cooling. During this curing, it substantially assumes the geometrical shape of the cavity 22 and thus forms the workpiece 16. By removing the mold 20, the produced workpiece 16 is made accessible. The workpiece comprises operative identification means 14 and is thus an identifiable workpiece. In the present case, the workpiece has the shape of a plastic cloud. According to the mold, workpieces of a variety of geometries, shapes and sizes can be produced. According to the primary-shaping production method and the primary formable starting material 12, workplaces of a variety of compositions and properties can be produced.

Figure 6:
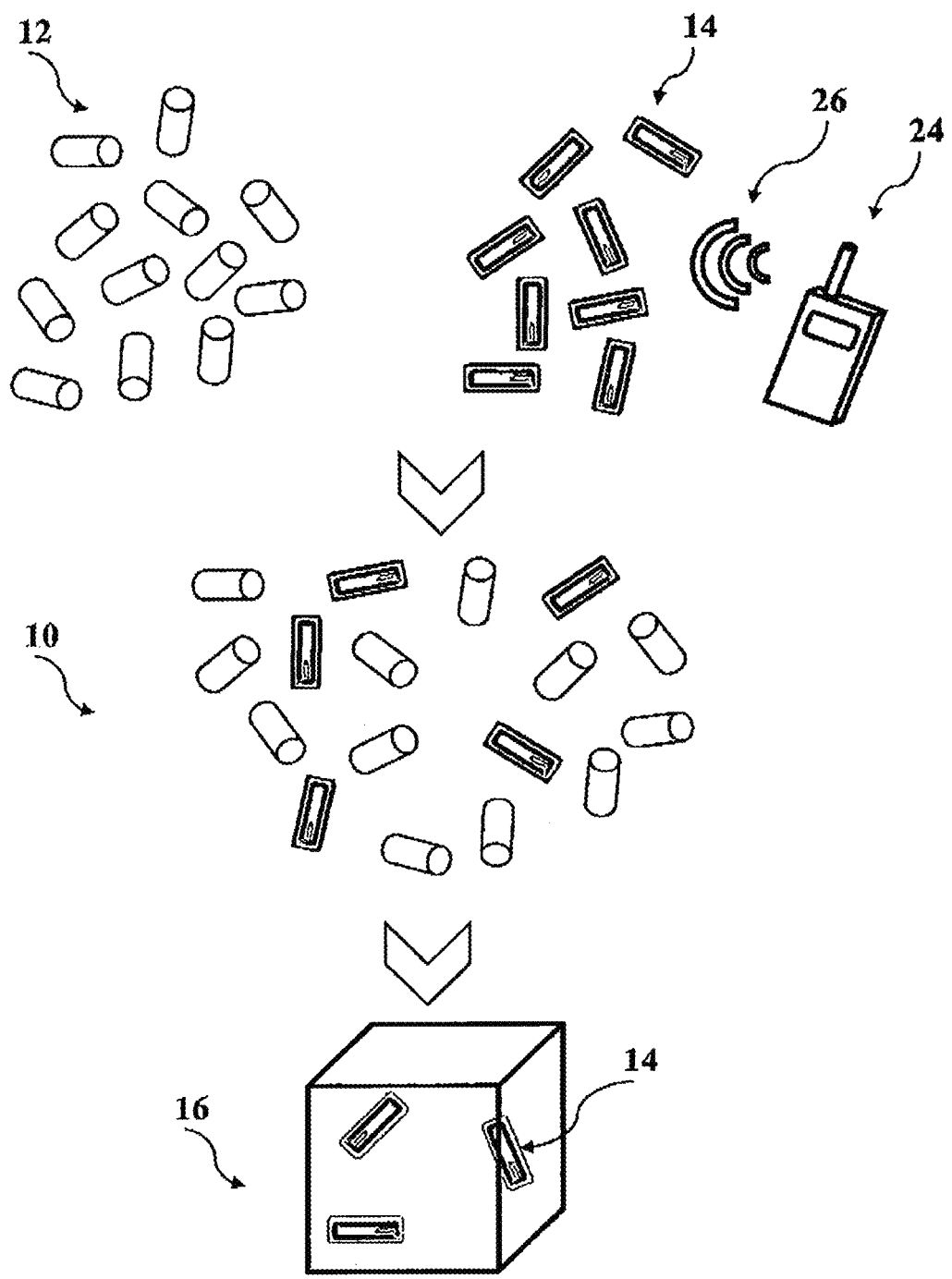
FIG. 6 shows another embodiment of a method for producing a workpiece.

FIG. 6 illustrates another embodiment of a method for producing an identifiable workpiece 16. The method comprises programming identification means 14, providing an identifiable material 10 by mixing a primary formable starting material 12 and a plurality of the programmed identification means 14, and performing a primary-shaping production method for producing an identifiable workpiece 16 from the identifiable material 10.

The method is substantially similar to the method illustrated in FIG. 1. However, in the method illustrated in FIG. 6, programming the identification means 14 is not performed after completion of the primary-shaping production method, but prior to mixing the starting material 12 and the identification means 14. In particular, by programming prior to mixing with the starting material 12, all produced workpieces 16 can be assigned a same identification code, for example, a common product number.

Performing the primary-shaping production method can be performed in a manner substantially similar to the method illustrated in FIG. 5, even though, in the case of FIG. 6, the produced workpiece has the shape of a cube (instead of a cloud).

Figure 7:
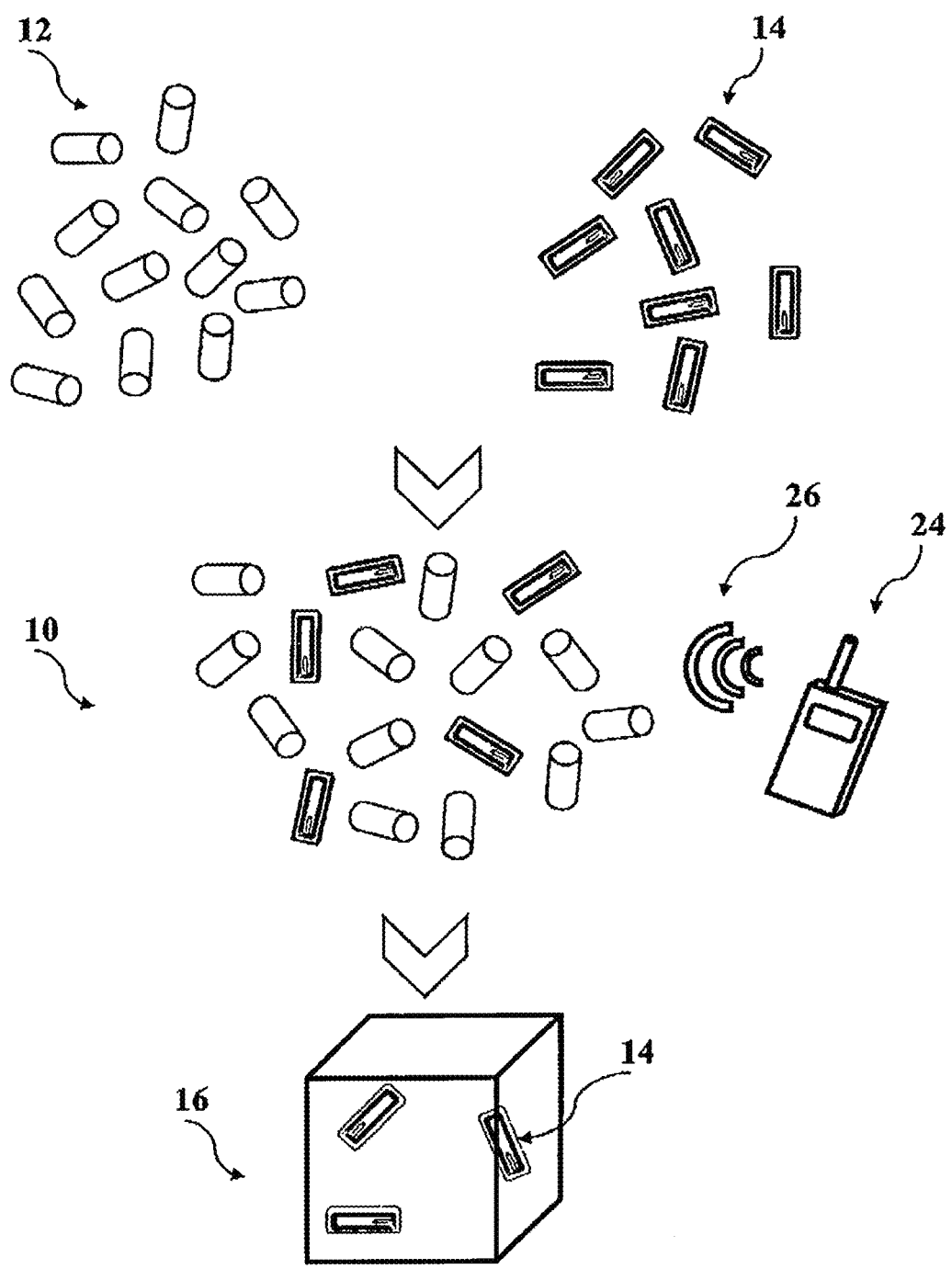
FIG. 7 shows a further embodiment of a method for producing a workpiece.

FIG. 7 illustrates a further embodiment of a method for producing an identifiable workpiece 16. The method comprises providing an identifiable material 10 by mixing a primary formable starting material 12 and a plurality of identification means 14, programming the identification means 14 included in the material 10, and performing a primary-shaping production method for producing an identifiable workpiece 16 from the identifiable material 10.

The method is substantially similar to the method illustrated in FIG. 1. However, in the method illustrated in FIG. 7, programming the identification means 14 is not performed after completion of the primary-shaping production method, but after mixing the starting material 12 and the identification means 14. In particular, by programming after mixing with the starting material 12, each provided material 10 can be assigned a unique identification code, for example, a batch number.

Figure 8:
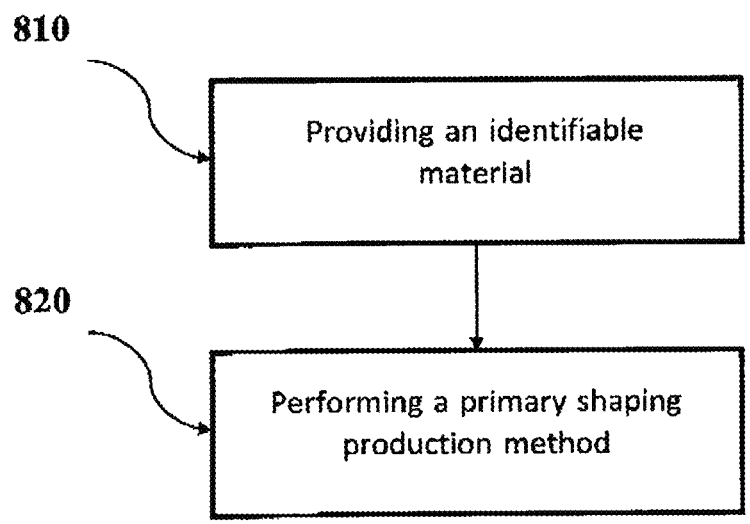
FIG. 8 shows a flowchart of an embodiment of a method for producing a workpiece.

FIG. 8 shows a flowchart of a method for producing an identifiable workpiece. The method comprises providing (810) an identifiable material including a primary formable starting material and at least one identification means 14 disposed in the starting material. The method further comprises performing (820) a primary-shaping production method for producing an identifiable workpiece from the identifiable material.

Figure 9:
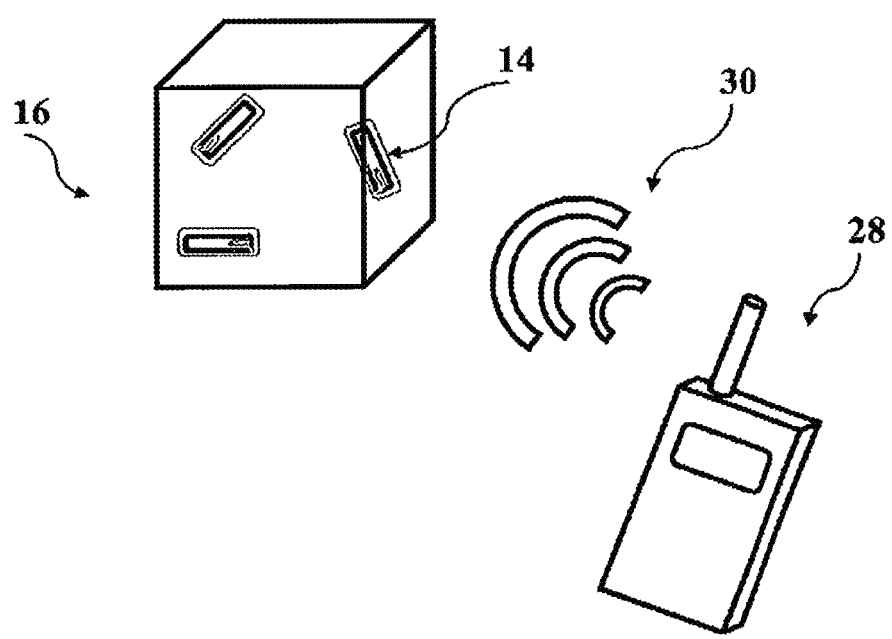
FIG. 9 shows an embodiment of an identification method.

FIG. 9 illustrates an embodiment of an identification method. The identification method comprises providing an identifiable workpiece 16, and detecting at least one identification means 14 included in the workpiece 16.

Detecting the at least one identification means 14 is carried out by means of a detection device 28 transmitting an interrogation signal 30 as an electromagnetic alternating field in the radio frequency range. The identification code of the workpiece 16 can be read out by detection. In particular, this can be a serial number unique to the workpiece 16 or a product number unique to the production series.

In the present case, a plurality of identification means 14 are included in the workpiece and at least a part of the plurality of identification means 14 is detected. The workpiece is considered as identified when a predetermined minimum number of the identification means 14 are detected and/or a predetermined minimum portion of the plurality of Identification 14 is detected.

In the case of the three illustrated identification means 14 within the workpiece 16, the predetermined minimum portion of identification means 14 may amount to, for example, 50%. Thus, the workpiece is considered as identified when two or more of the three identification means 14 are detected. In some embodiments this can be advantageous for achieving a reliable identification even if individual ones of the identification means 14 are defective, have not been programmed and/or cannot or not correctly be detected due to their position or orientation within the workpiece.

The detection device can be designed as a computer adapted to perform the steps of the identification method disclosed herein. For this purpose, the computer can execute a program code which represents a computer program and is stored in a computer-readable medium.

The method for identification of an identifiable workpiece can be performed for a variety of purposes. These purposes Include (a) quality control after completion of the production of a workpiece, (b) taking inventory, (c) registration of a payment process, and (d) checking export regulations. This is illustrated, in particular, on the basis of the following examples.

For example, it can be advantageous in quality control, e.g. in a produced steering wheel, to identify the origin or batch of the used starting material by use of the identification method and, in the case of deficiencies, to specifically isolate those workpieces produced from the starting material of this origin or batch.

The identification method can advantageously be used for automating inventory-taking, for example, of a large number of tools by identifying the tools, e.g. by use of their inventory or serial number, and by registering their presence and possibly their location, state, etc. in a database.

When registering a payment process, for example, when purchasing a shampoo, the identification method can determine the product number of the product to be purchased and thus the price. In contrast to the identification using a bar code, which is frequently used these days, a product manufactured by a production method disclosed herein is identifiable in any position and orientation. Furthermore, a radio-based identification method using, for example, radio frequency waves increases anti-theft security. This applies especially to automated payment processes not requiring checkout clerks.

Furthermore, for example, firearms are subject to certain export regulations which can be checked on the basis of their serial numbers. Conventional methods for identification are based on mechanically embossing a serial number which can, however, be removed or changed mechanically. By performing a production method disclosed herein, an identifiable firearm can be produced as a workpiece including a plurality of identification means 14 disposed in a distributed manner. Destruction or removal of all identification means 14 is not possible or at least not possible without destroying or rendering the firearm useless.

Figure 10:
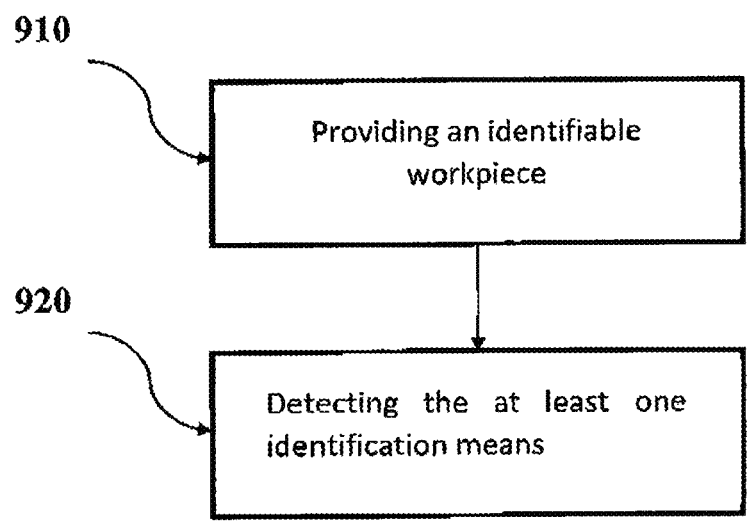
FIG. 10 shows a flowchart of an embodiment of a method for identifying a workpiece.

FIG. 10 shows a flowchart of an identification method. The identification method comprises providing (910) an identifiable workpiece produced by a primary-shaping production method, wherein the primary-shaping production method uses an identifiable material. The identification method further comprises detecting (920) the at least one identification means 14 within the workpiece.

A problem arises with the identification of, for example, a larger number of workpieces, especially when combined into larger batches, with workpieces to be accessible by a certain group of people only, and with workpieces not accessible or only with great difficulty due to their packaging and/or arrangement. Examples of this include a plurality of products (e.g. arms, vehicle spare parts, electronic devices, etc.) packaged in a box or the like, products located in a storage facility with limited access (e.g. free ports, arsenals, development department), and products packaged in such a manner that they are not accessible without damaging/destroying the package. In this respect, the present application discloses a so-called post-shipment inspection method.

Here, it is intended to use a detection device which can be the above detection device 28 including an interrogation means 36.

In the case of active identification means 14, the interrogation means 36 can receive response signals 38 therefrom comprising the respective identification code. Here, it can be intended that the interrogation means 36 previously emits a corresponding interrogation signal 30. In the latter respect, it can be intended that the interrogation means 36 is able to emit a single interrogation signal 30 causing a plurality of identification means 14 to return respective response signals 38. Furthermore, interrogation can be carried out such that a certain group among a plurality of identification means is interrogated.

In the case of passive identification means 14, especially (RFID) transponders, the interrogation means 36 can comprise hardware and/or software for supplying the passive identification means 14 with power with which they can emit the respective response signals 38 including the corresponding identification code. Also here it can be intended that the interrogation means 36 is able to address a plurality of passive identification means 14 for obtaining their identification codes. Also here interrogation can be carried out such that a certain group among a plurality of identification means is interrogated.

The identification means 14 described above can have a short range, making it necessary to maintain a short distance to an identification means 14 for obtaining its identification code. This may be the case, for example, with an active identification means 14 when its transmitter has low power or, for example, with a passive transponder in which a response signal 38 is generated when a corresponding interrogation signal is received from a short distance, and/or in which a response signal has a short range.

Identification means 14 having a short range are desired, for example, when a third party is to be prevented from interrogating the identification means 14 without authorization. An example of this includes arms wherein, for example, reading-out identification means 14 of arms during intended use thereof (e.g. in case of application) by an opponent in order to determine what kind of arm(s) or what number of arms is/are present is to be prevented.

For this purpose it is intended to arrange the interrogation means 36 in the vicinity, adjacent to the workpieces the identification code of which is to be obtained. This can be achieved by integrating/arranging the interrogation means 36 into or at a package of a plurality of workpieces to be identified.

Figure 11:
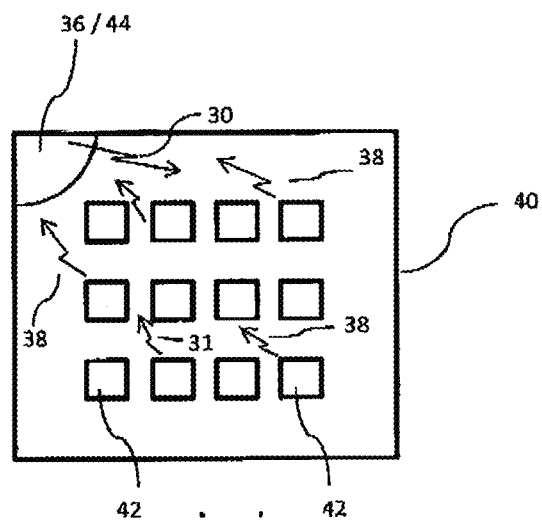
FIG. 11 shows a schematic representation of an identification arrangement, in particular, for a post-shipment inspection method.

This is illustrated in FIG. 11, in which an interrogation means 36 is accommodated in a box/package 40 including a plurality of workpieces 42 to be identified. This enables identification of all workpieces 42 without opening the box/package 40. Thus, it is possible to verify, not only during packaging the workpieces 42, whether those workpieces have actually been packaged that were supposed to be packaged and/or whether the correct number has been packaged. In fact, it is also possible to verify, during transportation and/or at the recipient, whether the content is unchanged without opining the package 40. This can be useful especially with workpieces which are packaged and shipped under seal, and/or with workpieces for which access control and relevant regulations exist, for example, in the case of safety-relevant products (e.g. electronic components) or arms.

Further, it is intended that the detection device 28 is also capable of passing on obtained identification codes, in which cases the detection device 28 comprises a transceiving means 44. The transceiving means 44 and the interrogation means 36 are able to communicate with each other at least to the extent that the transceiving means 44 can receive identification codes from the interrogation means 36 obtained/interrogated thereby. Preferably, the transceiving means 44 is further arranged and/or adapted to control the interrogation means 36 at least to the extent that it is activated for obtaining the identification codes from the identification means 14.

Furthermore, the transceiving means 44 can be arranged and/or adapted to communicate, preferably wirelessly, with a computer system 46 for transmitting the identification code thereto and/or for being controlled thereby. Transmission of identification codes by the transceiving means 44 can be carried out encrypted.

Communication with the computer system 46 can be carried out, for example, via WLAN, Bluetooth, radio signals and/or mobile radio signal as well as via intermediate transmission means, such as e.g. cables, the Internet, satellite links, etc.

For example, in a storage facility or storage area 48 with limited access, the transceiving means 44 can communicate with a computer system 46 located outside of the storage facility, for example, via WLAN 50 using a corresponding receiver 52, for example, for interrogating the identification codes of workpieces 42 present in the storage facility 48 and/or for transmitting identification codes to the computer system 46 under control of the computer system 46.

This enables obtaining the identification codes of workpieces 42 located in a storage facility or storage area 48 with limited access without the need for entering the storage facility or storage area.

In the storage facility 48, a plurality of detection devices 28 associated with, for example, a single or a plurality of boxes/packages (e.g. also grouped) located therein and/or a single or a plurality of workpieces 42 (e.g. also grouped) located therein can be used.

The computer system 46 can, in fact, be provided in any location. For example, the computer system 46 can be provided at the location of an organization (e.g. manufacturer, governmental and non-governmental audit authorities or institutions) spatially far remote from the workpieces 42 to be identified, especially when the computer system 46 and the transceiving means 44 are capable of communicating via the Internet 54.

Furthermore, it is thus possible to obtain Identification codes from workpieces 42 any number of times and at any time so that an improved control can be carried out, for example, by verifying whether the workpieces 42 are still present. This is useful, for example, when an arsenal is to be inspected to the effect whether arms delivered thereto are still present.

Figure 12:
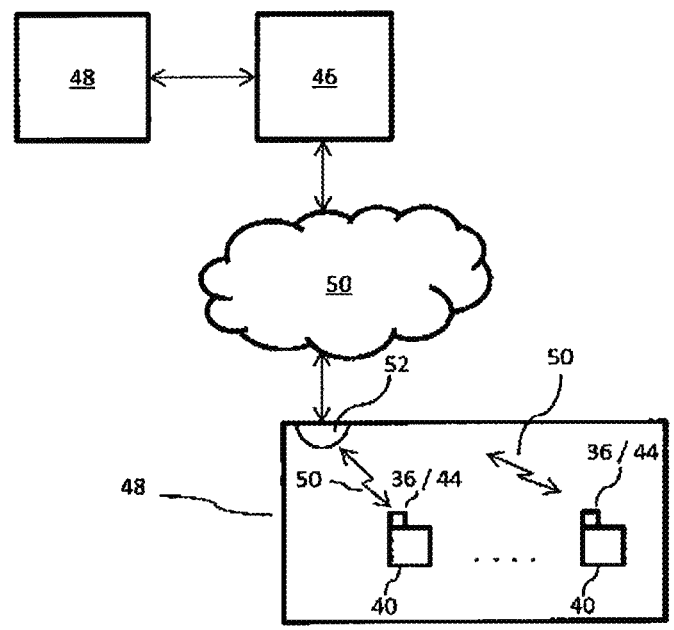
FIG. 12 shows a schematic representation of another identification arrangement, in particular, for a post-shipment inspection method.

Verification can be carried out by a database 56 which stores identification codes of workpieces. By comparing the stored identification codes and identification codes received from the transceiving means 44, it can be determined whether and what kinds of workpieces are present. This is illustrated in FIG. 12.

The post-shipment inspection method and the post-shipment inspection system described above and in the following can also be used to verify, during the production of workpieces into which other workpieces are to be integrated as components, whether the correct ones and/or all of the workpieces to be used for the production thereof are present in the produced workpiece. In such cases, it is also possible to—figuratively—speak of post-shipment inspection methods.

The above and the following explanations as to the post-shipment inspection method and post-shipment inspection system apply analogously to such cases, except that the presence or absence of at least one workpiece is not verified, for example, in a box, package, etc., but in another workpiece in the production of which the at least one first mentioned workpiece is/was supposed to be used.

In the post-shipment inspection method disclosed herein and further explained with reference to FIG. 13, a workpiece to be inspected (e.g. an arm) can, in part, be made of a material disclosed herein including at least one identification means therein. As in the embodiments explained with reference to FIGS. 11 and 12, the workpiece can comprise an identification means 14 provided, for example, as a separate component for the production of the workplace and integrated into the workpiece during production thereof.

The identification means 14 can also be designed as a retrofit component which is attached to or integrated into an existing workpiece. According to the present application, "integrated" means especially that the identification means 14 is/are attached in or to the workpiece, preferably in a non-releasable manner, or such that removal thereof results in (visible or otherwise noticeable) damages and/or changes to the workpiece.

An identification means 14 can be designed a transponder operating, for example, in the radio frequency range (e.g. 13.56 MHz), low frequency range (e.g. 125 kHz) and/or ultra-high frequency range (e.g. 865-869 MHz; 950 MHz).

In the post-shipment inspection method explained with reference to FIG. 13, a workpiece 42 (here; for example, an arm) is provided with at least one identification means 14 (e.g. in the form of one or more separate components or by using an identifiable material disclosed herein) already during production or subsequently thereto (e.g. by mounting/installing one or more separate components, or by mounting/installing an identifiable workpiece disclosed herein). In the following, it will be assumed, for convenience, that each workpiece 42 comprises one identification means 14; however, the explanations in this respect analogously also apply to workpieces 42 including two and more identification means 14.

The identification means 14 is provided with an identification code uniquely identifying the workpiece, as explained further above herein in various places.

The identification code can be assigned to and stored, respectively, in the identification means 14 prior to the production of a workpiece 42 or after the workpiece 42 is finished.

As already explained, for preventing unauthorized and/or undesired access by a third party, unauthorized person, etc., it is assumed here that the identification means 14 has a short range. In particular, this is to mean that the identification code of the identification means 14 can be obtained only when a device (see above) adapted for this purpose is located sufficiently close to the identification means 14.

However, for enabling access (especially for authorized persons) to the respective identification code at greater distances from the workpieces, a detection device 28 comprising an interrogation means 38 and a transceiving means 44 (see above) is provided. The detection device 28 is attached to the workpiece 42 (arm), prior to making the workpiece 42 (arm) ready for dispatch, as far from or as close to the identification means 14 that communication therewith is possible. For this purpose, it is required to know the location at or in the workpiece 42 where the identification means 14 is present (i.e. where it is integrated). This may not be necessary when the workpiece 42 is, at least in part, made of an identifiable material disclosed herein and this material includes a plurality of identification means 14; further there may be workpieces including, at least in an area, identification means 14 (almost) anywhere, which is why the detection device 28 can be positioned (almost) randomly (possibly at least in the area including identification means 14).

After that, the workpieces 42 are made ready for dispatch, for example, packaged into boxes 40 (see FIG. 13).

Prior to dispatching the boxes 40 and, in particular, at any time and/or in any location after that, it can be verified by the detection means 28, whether the workpieces 42 originally made ready for dispatch (packaged) are still present in the boxes 40 or not.

For this purpose, the identification code of the respective Identification means 14 is interrogated by the interrogation means 36 and transmitted from the identification means 14 to the respective interrogation means 36, respectively. The respective obtained identification codes are then transmitted to a computer system 46 by the transceiving means 44. The above explanations in this respect apply analogously here.

The computer system 46 knows—for example, from information provided by access to a database or another data source, and/or information present in the computer system 46—what workpieces 42 are to be present. Based on the identification codes obtained by the detection devices 28, the computer system 46 can verify what workpieces 42 are actually present and if and what workpieces are missing.

As already described above, the computer system 46 can control the detection devices 28, in particular, for interrogating present identification means 14 and for obtaining present identification codes, respectively.

Thus, the computer system 46 can also interrogate identification means 14 (possibly via the detection device) which are present but not intended (e.g. due to errors during making ready for dispatch and/or subsequent manipulation). This (also) enables a determination, on the basis of the respective identification code, whether there are workpieces which should not be present and, if present, what kinds of workpieces.

When a post-shipment inspection is no longer desired or necessary, for example, after removal of the workpieces 42 from the packages 40, the detection devices 28 can be removed. Since the identification means 14 are still present in/at the workpieces 42, identification thereof and/or a further post-shipment inspection is possible anytime later.

As already described above, communication between the computer system 46 and a detection device 28 can be carried out via WLAN, Bluetooth, radio signals and/or mobile radio signals as well as via intermediate transmission means, such as e.g. cables, the Internet, satellite links, etc. The means required for this purpose, especially a corresponding transceiving unit 58, can be integrated into or connected to the computer system 46.

A further variant is that the computer system 46 comprises a transceiving unit 58 specifically adapted for communication with a transceiving means 44 of a detection device 28 and integrated into the computer system 46 or provided, for example, in the form a device (e.g. a USB stick) that can be connected to the computer system 46 via USB, WLAN, etc. The communication between the computer system 46 or the transceiving unit 58 thereof and a detection device 28 can be carried out by using corresponding interrogation signals 60 and response signals 62.

Embodiments and variants of the above described subject matters are again given in the following:

Disclosed is an identifiable material comprising:
 a primary formable starting material, and
 at least one identification means disposed in the starting material, characterized in that
 each of the at least one identification means contains an identification code uniquely distinguishing the material from other materials made of the primary formable starting material.

In the identifiable material, a plurality of identification means can be disposed in the starting material in a distributed manner.

In the identifiable material, the starting material can comprise at least one of the following types of starting materials: plastic material, fiber composite, resin, radiation-curable liquid, plaster, ceramics and clay, metal, varnish.

In the identifiable, material, a solid body can be produced from the starting material by at least one of the following primary-shaping production methods: thermoplastic primary shaping, injection molding, extrusion, sintering, laser sintering and 3D printing, die casting.

In the identifiable material, the at least one identification means can be a transponder, preferably an RFID transponder.

In the identifiable material, the at least one identification means can comprise at least one of the following components: an antenna, an oscillating circuit, a circuit, a microprocessor, a read-only memory (ROM), a one-time programmable read-only memory (PROM), an EPROM, an EEPROM, a FRAM or FeRAM.

Further disclosed is a method for producing an identifiable workpiece which can comprise the following steps:
 providing an identifiable material disclosed herein, and
 performing a primary-shaping production method for producing an identifiable workpiece from the identifiable material.

The method can further comprise the step of:
 programming the at least one identification means.

Further disclosed is a workpiece produced by a primary-shaping production method using an identifiable material disclosed herein.

The workpiece can be produced by a method disclosed herein for producing an identifiable workpiece.

In the workpiece, it can be intended that the workpiece itself is destroyed when the identification means is removed or destroyed.

Further disclosed is an identification method here comprising the following steps:
 providing a workpiece disclosed herein, and
 detecting the at least one identification means within in the workpiece.

In the identification method, a plurality of identification means can be included in the workpiece, wherein at least a part of the plurality of identification means is detected.

In the identification method, the workpiece can be considered as identified when a predetermined minimum number of the identification means are detected, and/or a predetermined minimum portion of the plurality of identification means is detected.

Further disclosed is a computer program product that is stored in a computer-readable medium and includes a program code which, when executed by a computer, performs the steps of a method disclosed herein.

Further disclosed is art identification method comprising the following steps:
 interrogating, by an interrogation means, a plurality of workpieces including identification means integrated therein, each providing an identification code uniquely distinguishing the corresponding workpiece for obtaining the respective identification codes,
 communicating the interrogated identification codes from the interrogation means to a transceiving means arranged adjacent to the workpieces,
 transmitting the communicated identification codes from the transceiving means to a remote computer system,
 verifying the transmitted identification codes by comparing them to a database containing identification codes.

In the identification method, the workpieces can each be a workpiece disclosed herein.

In the identification method, communicating the interrogated identification codes from the interrogation means to the transceiving means can be carried out wirelessly.

In the identification method, transmitting the communicated identification codes from the transceiving means to the remote computer system can be carried out, at least in part, via the Internet.

In the identification method, when verifying the transmitted identification codes by comparing them to a database containing identification codes, it can be verified whether predetermined identification codes contained in the database have been transmitted.

Also disclosed is a device for performing one of the methods disclosed herein as well as a computer program product that Is stored in a computer-readable medium and includes a program code which, when executed by a computer, performs the steps of a method disclosed herein.

| List of reference numerals | |
|---|---|
| Material | 10 |
| Starting material | 12 |
| Identification means | 14 |
| Workpiece | 16 |
| UV light source | 18 |
| Mold | 20 |
| Cavity | 22 |
| Programming device | 24 |
| Programming signal | 26 |
| Detection device | 28 |
| Interrogation signal | 30 |
| Antenna | 32 |
| Digital circuit | 34 |
| Interrogation means | 36 |
| Response signal | 38 |
| Box/package | 40 |
| Workpiece/product | 42 |
| Transceiving means | 44 |
| Computer system | 46 |
| Storage facility/area | 48 |
| WLAN | 50 |

-continued

List of reference numerals

| | |
|---|---|
| WLAN receiver | 52 |
| Internet | 54 |
| Database | 56 |
| Transceiving unit of computer system 46 | 58 |
| Interrogation signal of computer system | 60 |
| Response signal of detection device | 62 |

What is claimed is:

1. A post-shipment inspection method for inspecting workpieces, the method comprising:
    providing a workpiece with a short-range radio-frequency identifier, the radio-frequency identifier being operable to generate, as a response to an interrogation signal, a response signal that includes an identification code that is uniquely associated with the workpiece;
    packaging, under seal, the workpiece with the radio-frequency identifier along with a detection device to generate the interrogation signal for the radio-frequency identifier;
    wherein packaging the workpiece along with the detection device includes sufficiently confining the workpiece and detection device within a package such that only the detection device can interrogate the radio-frequency identifier of the workpiece;
    enabling the detection device to be signaled from outside of the package, in order to cause the detection device to interrogate the radio-frequency identifier of the workpiece and to transmit the identification code to a computer system that is located at a remote location outside of the package;
    comparing, by the computer system, the transmitted identification code to the identification code that is uniquely associated with the workpiece; and
    verifying, by the computer system and based at least in part on comparing the transmitted identification code to the identification code that is uniquely associated with the workpiece, that the workpiece is present in the package.

2. The method according to claim 1, wherein providing the workpiece with the radio-frequency identifier includes providing the workpiece with a transceiver that is specially adapted for communication with the detection device.

3. The method according to claim 1, wherein the identification code that is uniquely associated with the workpiece is stored in a database containing identification codes that is accessible to the computer system.

4. The method according to claim 1, wherein:
    providing a workpiece with a radio-frequency identifier includes providing the workpiece with a plurality of radio-frequency identifiers, and wherein the detection device is operable to interrogate each of the plurality of radio-frequency identifiers from within the package; and
    wherein verifying that the workpiece is also present is also based on determining that a predetermined minimum number of the plurality of radio-frequency identifiers are interrogated by the detection device as a response to the detection device being signaled from outside of the package.

5. The method according to claim 1, wherein the radio-frequency identifier includes a transponder.

6. The method according to claim 1, wherein the workpiece is made of an identifiable material comprising a primary formable starting material, wherein providing the workpiece with the radio-frequency identifier includes disposing the radio-frequency identifier in the starting material, and wherein the identification code uniquely distinguishing the identifiable material from other materials made of the primary formable starting material.

7. The method according to claim 6, wherein providing the workpiece with the radio-frequency identifier includes disposing a plurality of radio-frequency identifier in the starting material.

8. The method according to claim 1, wherein the radio-frequency identifier includes at least one of:
    an antenna, an oscillating circuit, a circuit, a microprocessor, a read-only memory (ROM), a one-time programmable read-only memory (PROM), an EPROM, an EEPROM, a FRAM, or FeRAM.

9. A post-shipment inspection system for inspecting workpieces, the system comprising:
    a radio-frequency identifier that is integrated with a workpiece, the radio-frequency identifier being operable to generate, as a response to an interrogation signal, a response signal that includes an identification code that is uniquely associated with the workpiece;
    a detection device operable to interrogate the radio-frequency identifier, by (i) generating an interrogation signal for the radio-frequency identifier, (ii) detecting a response to the interrogation signal that includes the identification code;
    wherein the radio frequency identifier is limited to a short range such that only the detection device can interrogate the radio-frequency identifier of the workpiece when the workpiece and detector device are confined to a sealed package;
    a computer system including a transceiving device, the computer system being located at a location that is remote and outside of the package to signal the detection device using the transceiving device; and
    wherein the detection device is operable to respond to the signal by interrogating the radio-frequency identifier of the workpiece and transmitting the identification code to the computer system;
    wherein the computer system is operable to compare the transmitted identification code to the identification code that is uniquely associated with the workpiece, and based on comparing the transmitted identification code to the identification code that is uniquely associated with the workpiece, verify that the workpiece is present in the package.

10. The system according to claim 9, wherein the workpiece is made of an identifiable material comprising a primary formable starting material and the radio-frequency identifier disposed in the starting material.

11. The system according to claim 10, wherein a plurality of radio-frequency identifiers are disposed in the starting material of the workpiece.

12. The system according to claim 10, wherein the radio-frequency identifier includes at least one of:
    an antenna, an oscillating circuit, a circuit, a microprocessor, a read-only memory (ROM), a one-time programmable read-only memory (PROM), an EPROM, an EEPROM, a FRAM or FeRAM.

* * * * *